US012600349B2

(12) United States Patent
Lee

(10) Patent No.: US 12,600,349 B2
(45) Date of Patent: Apr. 14, 2026

(54) METHOD AND APPARATUS FOR ASSISTING FORWARD COLLISION AVOIDANCE BASED ON DRIVING ENVIRONMENT

(71) Applicant: HYUNDAI MOBIS CO., LTD., Seoul (KR)

(72) Inventor: Jun Yung Lee, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 208 days.

(21) Appl. No.: 18/087,942

(22) Filed: Dec. 23, 2022

(65) Prior Publication Data

US 2023/0406294 A1 Dec. 21, 2023

(30) Foreign Application Priority Data

Jun. 21, 2022 (KR) ........................ 10-2022-0075543

(51) Int. Cl.
| | |
|---|---|
| *B60W 30/09* | (2012.01) |
| *B60W 10/18* | (2012.01) |
| *B60W 30/095* | (2012.01) |
| *B60W 40/06* | (2012.01) |
| *B60W 40/105* | (2012.01) |
| *B60W 40/114* | (2012.01) |

(52) U.S. Cl.
CPC ............ *B60W 30/09* (2013.01); *B60W 10/18* (2013.01); *B60W 30/0956* (2013.01); *B60W 40/06* (2013.01); *B60W 40/105* (2013.01); *B60W 40/114* (2013.01); *B60W 2420/403* (2013.01); *B60W 2420/408* (2024.01); *B60W*

*2520/14* (2013.01); *B60W 2540/18* (2013.01); *B60W 2552/05* (2020.02); *B60W 2554/402* (2020.02); *B60W 2554/4041* (2020.02); *B60W 2554/80* (2020.02); *B60W 2556/45* (2020.02)

(58) Field of Classification Search
CPC .. B60W 30/09; B60W 2552/05; B60W 10/18; B60W 2520/10; B60W 30/10; B60W 2556/45; B60W 30/0956
See application file for complete search history.

(56) References Cited

U.S. PATENT DOCUMENTS

| | | | | |
|---|---|---|---|---|
| 2012/0035846 A1* | 2/2012 | Sakamoto | ............. | G01S 13/867 701/301 |
| 2012/0127016 A1* | 5/2012 | Watanabe | ............... | G01S 13/34 342/146 |
| 2018/0342160 A1* | 11/2018 | Komori | ................ | G05D 1/0246 |
| 2020/0406747 A1* | 12/2020 | Sakai | ........................ | B60R 1/24 |

(Continued)

*Primary Examiner* — Toya Pettiegrew
(74) *Attorney, Agent, or Firm* — Morgan, Lewis & Bockius LLP

(57) ABSTRACT

A method for forward collision avoidance assist includes: collecting driving environment information of a vehicle; detecting at least one front object positioned in front of the vehicle and acquiring front object information of the front object; generating a driving trajectory of the vehicle based on motion information of the vehicle; selecting a candidate object from the front object based on the driving environment information and the front object information; determining a target object based on information of the candidate object and the driving trajectory of the vehicle; and controlling a brake system included in the vehicle based on a risk of collision between the vehicle and the target object.

15 Claims, 3 Drawing Sheets

(56) References Cited

U.S. PATENT DOCUMENTS

| | | | |
|---|---|---|---|
| 2022/0080957 A1* | 3/2022 | Rodriguez Romero | .. B60T 7/22 |
| 2022/0092987 A1* | 3/2022 | Oboril | B60W 30/0956 |
| 2023/0192192 A1* | 6/2023 | Morita | G08G 1/16 |

* cited by examiner

<u>10</u>

DRIVING ENVIRONMENT INFORMATION COLLECTOR ～110

FRONT OBJECT INFORMATION ACQUIRER ～120

DRIVING TRAJECTORY GENERATOR ～130

CANDIDATE OBJECT SELECTOR ～140

TARGET OBJECT DETERMINER ～150

CONTROLLER ～160

METHOD AND APPARATUS FOR ASSISTING FORWARD COLLISION AVOIDANCE BASED ON DRIVING ENVIRONMENT

CROSS-REFERENCE TO RELATED APPLICATION

This application is based on, and claims the benefit of priority from, Korean Patent Application No. 10-2022-0075543, filed on Jun. 21, 2022, the disclosure of which is incorporated by reference herein in its entirety.

TECHNICAL FIELD

The present disclosure relates to a method and apparatus for assisting forward collision avoidance based on a driving environment. More specifically, the present disclosure relates to a method and apparatus for assisting a vehicle's forward collision avoidance using a variable target selecting strategy suitable for a driving environment.

BACKGROUND

The description in this section merely provides background information on embodiments of the present disclosure and does not necessarily constitute the related art.

As a driving safety assistance technology related to autonomous driving, a forward collision avoidance assist (FCA) is being actively researched and commercialized. The FCA not only warns a driver of a risk of collision by detecting the risk of collision between a vehicle traveling on a road and an object in front in advance, but also assists a braking force input by the driver into a braking system or autonomously brakes and/or steers the vehicle so as to avoid or reduce the risk of collision.

Recently, demands for the FCA are gradually increasing, and it is necessary for the FCA to cope with a front vehicle, a pedestrian, a cyclist, and an oncoming vehicle. Accordingly, the FCA always checks whether there are other vehicles, pedestrians, cyclists, and the like among objects recognized by the sensor mounted on the vehicle, and selects target objects for each object type for which collision risk determination is required.

However, types of objects may be different according to the driving environment of the vehicle. For example, when the vehicle is traveling on a highway with a median strip, it is generally difficult to predict the presence of pedestrians, cyclists, or oncoming vehicles in front of the vehicle, except for vehicles in front. Nevertheless, the current FCA performs an operation to select target objects for each object type without considering the driving environment of the vehicle. This has a problem causing unnecessary computational load.

In addition, a malfunction of the FCA may occur due to misrecognition of objects. For example, there was a case of malfunction of the FCA because the camera misrecognized a traffic sign as a pedestrian even though the vehicle was driving on a highway.

SUMMARY

According to an embodiment of the present disclosure, it is possible to provide a function of performing an operation for selecting target objects by limiting the object types that are suitable for the driving environment of the vehicle.

According to an embodiment of the present disclosure, it is possible to provide a function of confirming whether or not an object is erroneously recognized based on the object types that are suitable for the driving environment of the vehicle.

The problems to be solved by the present disclosure are not limited to the problems mentioned above, and other problems not mentioned will be clearly understood by those skilled in the art from the following description.

In one aspect, a method for forward collision avoidance assist includes: collecting driving environment information of a vehicle; detecting at least one front object positioned in front of the vehicle and acquiring front object information of the front object; generating a driving trajectory of the vehicle based on motion information of the vehicle; selecting a candidate object from the front object based on the driving environment information and the front object information; determining a target object based on information of the candidate object and the driving trajectory of the vehicle; and controlling a brake system included in the vehicle based on a risk of collision between the vehicle and the target object.

In another aspect, an apparatus for forward collision avoiding assist includes: a driving environment information collector configured to collect driving environment information of a vehicle by using at least one of GPS or V2X communication; a front object information acquirer configured to detect at least one front object positioned in front of the vehicle and acquire front object information of the front object using at least one of a camera or a radar; a driving trajectory generator configured to generate a driving trajectory of the vehicle based on motion information on the vehicle, the motion information obtained from at least one sensor mounted on the vehicle; a candidate object selector configured to select a candidate object from the front object based on the driving environment information and the front object information; a target object determiner configured to determine a target object based on information of the candidate object and the driving trajectory of the vehicle; and a controller configured to control a brake system included in the vehicle based on a risk of collision between the vehicle and the target object.

Other features and aspects will be apparent from the following detailed description, the drawings, and the claims.

According to an embodiment of the present disclosure, unnecessary computational load of the FCA function can be efficiently reduced by performing an operation for selecting target objects only for the object types that are suitable for the driving environment of the vehicle.

According to an embodiment of the present disclosure, by checking whether an object is erroneously recognized based on the object types suitable for the driving environment of the vehicle, a malfunction of the FCA function can be prevented, thereby improving the safety and convenience of the driver.

DETAILED DESCRIPTION

Figure 1:
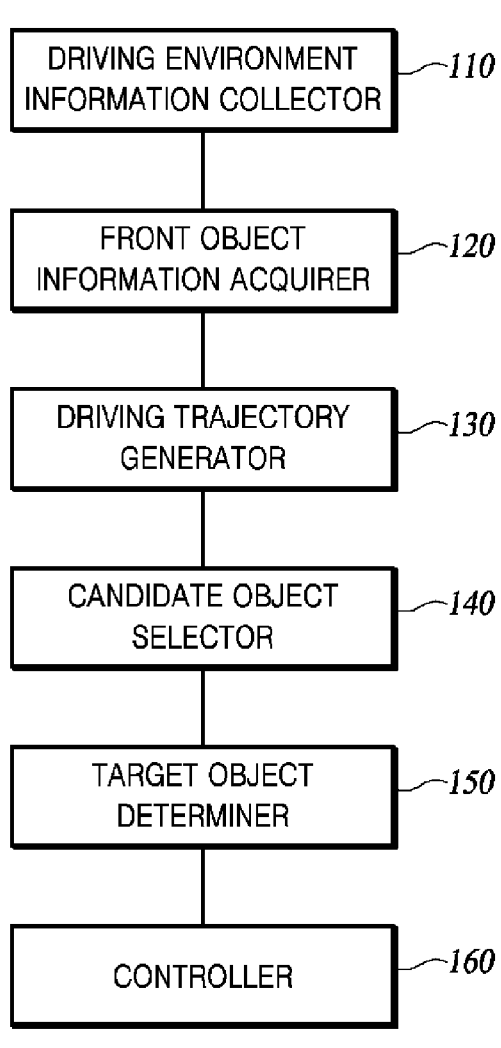
FIG. 1 shows a block diagram for an apparatus for forward collision avoidance assist according to an embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered obscuring the subject of the present disclosure will be omitted for the purpose of clarity and brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

The detailed description set forth below in conjunction with the appended drawings is intended to describe exemplary embodiments of the present disclosure and is not intended to represent the only embodiments in which the present disclosure may be practiced.

FIG. 1 shows a block diagram for an apparatus for forward collision avoidance assist according to an embodiment of the present disclosure.

Referring to FIG. 1, an apparatus 10 for forward collision avoidance assist may include all or at least one of a driving environment information collector 110, a front object information acquirer 120, a driving trajectory generator 130, a candidate object selector 140, a target object determiner 150, or a controller 160.

The components of the apparatus 10 for forward collision avoidance assist may transmit or receive signals or data via an internal communication system of a vehicle. Here, the internal communication system of the vehicle may use at least one of Controller Area Network (CAN), CAN with Flexible Data rate (CAN FD), Local Interconnect Network (LIN), FlexRay, or Ethernet as a communication protocol.

The driving environment information collector 110 may collect information on a driving environment of the vehicle (hereinafter, referred to as "driving environment information"). The driving environment information collector 110 may collect driving environment information from at least one of other vehicles, infrastructure, external devices, satellites, or navigation systems. Here, the driving environment information may include a type, a state, and a traffic situation of a road on which the vehicle is traveling.

The driving environment information collector 110 may collect driving environment information using a vehicle-to-everything (V2X) communication and/or a global positioning system (GPS). Here, the V2X communication may refer to the exchange or sharing of information between a vehicle and an object via wired and/or wireless networks, and include vehicle-to-vehicle (V2V) communication, vehicle-to-infrastructure (V2I) communication, vehicle-to-network (V2N) communication, vehicle-to-pedestrian (V2P) communication, vehicle-to-device (V2D) communication, and the like.

The driving environment information collector 110 may measure a current position of the vehicle by using a signal received from a GPS. The driving environment information collector 110 may collect driving environment information corresponding to the current position of the vehicle from the automotive navigation system or map data.

The front object information acquirer 120 may detect at least one front object among other vehicles, pedestrians, and cyclists positioned in front of the vehicle, and may acquire information on the front object (hereinafter, referred to as "front object information"). Here, other vehicles may include a front vehicle and/or an oncoming vehicle. Here, the front object information may include a type of the front object, a position of the front object, a relative speed between the vehicle and the front object, and a relative distance between the vehicle and the front object.

The front object information acquirer 120 may detect the front object using at least one of a camera, a radar (radio detection and ranging), a lidar (light detection and ranging), or an ultrasonic sensor, and acquire the front object information. Meanwhile, a detailed method of detecting an object using data collected from a sensor and acquiring information on the object is common in the technical field, and thus, a detailed description thereof will be omitted.

The driving trajectory generator 130 may generate a driving trajectory of the vehicle using information on movement of the vehicle (hereinafter, referred to as "motion information"). Here, the motion information may include at least one of a position, a speed, a yaw rate, or a steering angle of the vehicle. A detailed method of generating a current driving trajectory and/or an expected driving trajectory of the vehicle using motion information is common in the technical field, and thus, a detailed description thereof will be omitted.

The motion information may be acquired by using at least one of an inertial measurement unit (IMU), a wheel speed sensor, a wheel pulse sensor, an acceleration sensor, a yaw sensor, a gyro sensor, or a steering angle sensor. In addition, other sensors may be used to acquire the motion information of the vehicle.

In order to efficiently manage a computational load required for the FCA functionality, the candidate object selector 140 may select a candidate object that is expected to need to be dealt with by the FCA in consideration of the driving environment information of the vehicle. Specifically, a candidate object suitable for the driving environment may be selected from detected front objects. For example, when the vehicle is driving on a highway with a median strip, only front vehicles may be selected as candidate objects from detected objects, whereas pedestrians, cyclists, and oncoming vehicles may not be selected as candidate objects.

In order to classify object types suitable for the driving environment, the candidate object selector 140 may use a reference table including expected object types corresponding to each road type from among a plurality of types of road. Table 1 shows an example of a reference table, and data values in the reference table may differ according to a manufacturer of the forward collision avoidance assist system or according to related statistics.

TABLE 1

| Driving environment information (road type) | | Object types suitable for driving environment |
|---|---|---|
| | normal road | front vehicle, pedestrian, cyclist, and oncoming vehicle |
| highway | one-way (including a case where a lane is separated by guard rails) | front vehicle |

TABLE 1-continued

| Driving environment information (road type) | | Object types suitable for driving environment |
|---|---|---|
| | a case where a lane is not separated by guard rails | front vehicle, oncoming vehicle |
| urban expressway or national route | one-way (including a case where a lane is separated by guard rails) | front vehicle, cyclist |
| | a case where a lane is not separated by guard rails | front vehicle, cyclist, and oncoming vehicle |

The candidate object selector 140 may inquire from the reference table at least one expected object type corresponding to a type of road on which the vehicle is traveling, and may select a front object corresponding to the expected object type as a candidate object. For example, if a type of road on which the vehicle is traveling is a highway without guardrails and detected objects are front vehicles, pedestrians, and oncoming vehicles, only front vehicles and oncoming vehicles may be selected as candidates while the pedestrians are excluded.

The candidate object selector 140 may select a candidate object based on whether the driving environment information is valid. The candidate object selector 140 may determine whether the driving environment information is valid, and when it is determined that the driving environment information is invalid, all detected front objects may be selected as candidate objects. Whether the driving environment information is valid may be determined by, for example, comparing multiple pieces of driving environment information received from multiple driving environment information providing sources.

The candidate object selector 140 may regard a front object which is not selected as a possibly misrecognized object in order to prevent or reduce a malfunction of the FCA due to a sensor's misrecognition of the front object. The candidate object selector 140 may cross-check again whether the sensor has misrecognized the possibly misrecognized object, and may determine whether to select the possibly misrecognized object as a candidate object according to a result of the cross-check.

The target object determiner 150 may determine at least one target object based on information of the candidate object and the driving trajectory of the vehicle. Here, the target object may refer to an object subject to collision risk and braking intervention judgements. For example, a candidate object positioned in the driving trajectory of the vehicle may be determined as a target object. When a plurality of candidate objects are present in the driving trajectory of the vehicle, a candidate object closest to the vehicle may be determined as a target object.

The target object determiner 150 may determine target objects by each object type. For example, the target object determiner 150 may classify and group a plurality of candidate objects by each object type, and may determine a candidate object for each object type positioned in the driving trajectory of the vehicle as a target object. When a plurality of candidate objects for each object type are present in the driving trajectory of the vehicle, a candidate object closest to the vehicle may be determined as a target object.

The controller 160 may control a braking system of the vehicle based on a collision risk between the vehicle and the target object. Here, the braking system may include a regenerative brake system and/or a friction brake system. The controller 160 may issue a braking intervention command to the braking system by determining whether to intervene in braking and target deceleration based on the collision risk.

The controller 160 may visually and/or aurally warn a driver of the collision risk by using an Audio/Video/Navigation (AVN) system, a cluster on the front of the vehicle interior, a Head Up Display (HUD), a speaker, etc.

Figure 2:
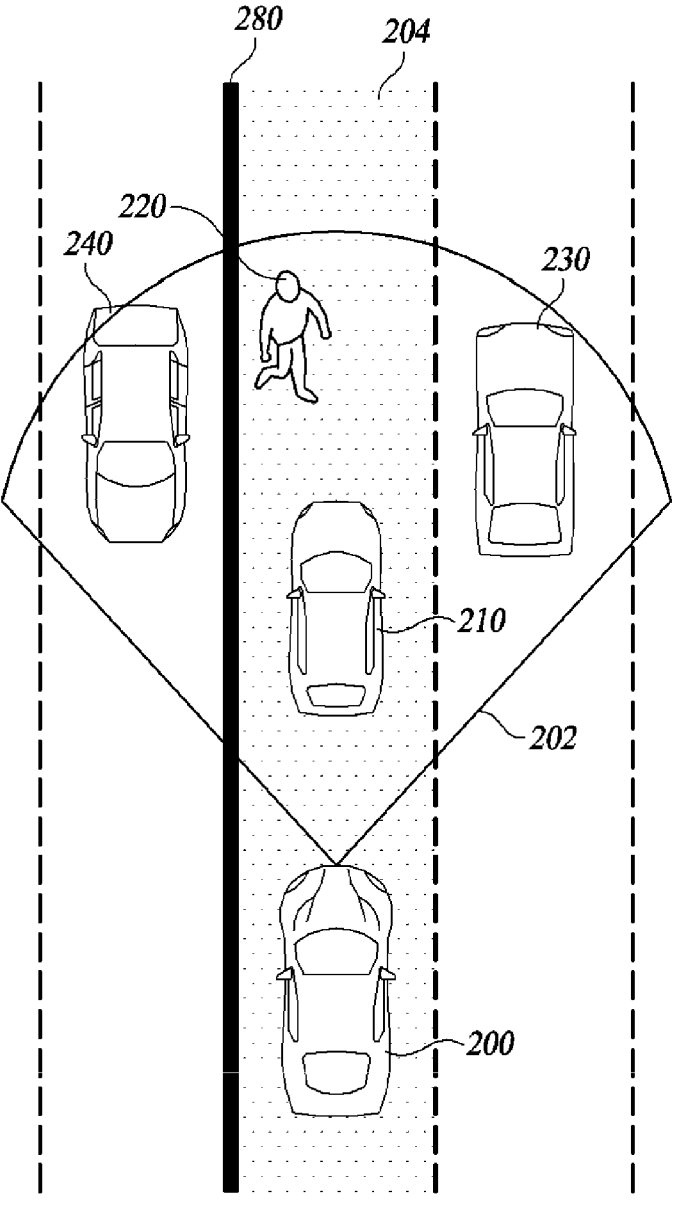
FIG. 2 shows an exemplary diagram for explaining that an apparatus for forward collision avoidance assist determines a target object according to an embodiment of the present disclosure.

FIG. 2 shows an exemplary diagram for explaining that an apparatus for forward collision avoidance assist determines a target object according to an embodiment of the present disclosure.

Referring to FIG. 2, it shows a situation in which while an ego-vehicle 200 is driving on a highway with a guard rail 280, a first front vehicle 210, a pedestrian 220, a second front vehicle 230, and an oncoming vehicle 240 are assumed to be detected within a detection range 202.

Since the ego-vehicle 200 is driving on the highway with a guard rail, a type of object suitable for the driving environment may be determined as a front vehicle based on the reference table of Table 1.

The first front vehicle 210 may be selected as a candidate object suitable for the driving environment, and may be determined as a target object because the first front vehicle 210 is positioned within a driving trajectory 204 of the ego-vehicle.

The pedestrian 220 may be treated as a possibly misrecognized object that is not suitable for the driving environment, and whether a sensor has misrecognized a front object may be cross-checked. Depending on a result of the cross-check, the pedestrian may be excluded from candidate objects or a FCA may operate conservatively.

The second front vehicle 230 may be selected as a candidate object suitable for the driving environment, but may be excluded from target objects because the second front vehicle 230 is positioned outside the driving trajectory 204 of the ego-vehicle.

The oncoming vehicle 240 may be treated as a possibly misrecognized object that is not suitable for the driving environment, and whether the sensor has misrecognized a front object may be cross-checked. However, since the oncoming vehicle 240 is positioned outside the driving trajectory of the ego-vehicle, the oncoming vehicle 240 may be excluded from target objects.

Figure 3:
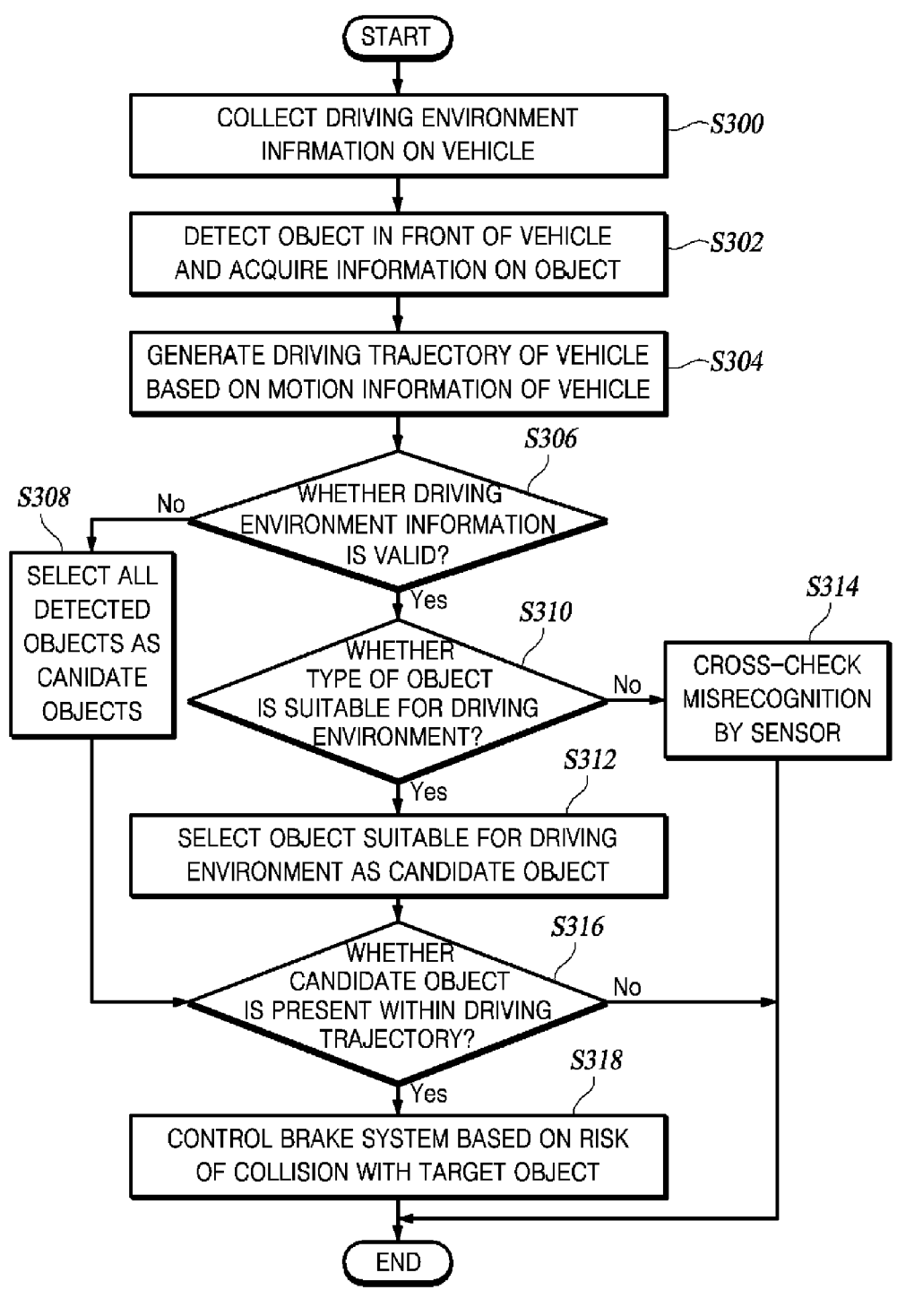
FIG. 3 shows a flowchart for a method for forward collision avoidance assist according to an embodiment of the present disclosure.

FIG. 3 shows a flowchart for a method for forward collision avoidance assist according to an embodiment of the present disclosure.

Referring to FIG. 3, an apparatus 10 for forward collision avoidance assist may collect driving environment information of a vehicle in order to select a candidate object suitable for the driving environment in operation S300, and may detect a front object positioned in front of the vehicle and acquire information on the front object in operation S302. The apparatus 10 for forward collision avoidance assist may generate a driving trajectory of the vehicle based on motion information acquired from at least one sensor mounted on the vehicle in operation S304.

The apparatus 10 for forward collision avoidance assist may determine whether the collected driving environment information is valid in operation S306.

When it is determined that the driving environment information is not valid, the apparatus 10 for forward collision avoidance assist may select all detected front objects as candidate objects in order to conservatively perform the FCA function in operation S308.

When it is determined that the driving environment information is valid, the apparatus 10 for forward collision avoidance assist may determine whether the detected front object is suitable for the driving environment in operation S310. The apparatus 10 for forward collision avoidance assist may select only a front object suitable for the driving environment as a candidate object in operation S312. If a front object is not suitable for the driving environment, the apparatus 10 for forward collision avoidance assist may treat the front object as a possibly misrecognized object, thereby cross-checking whether there has been misrecognition by a sensor, and excluding the corresponding front object from target objects or conservatively operating a FCA function depending on a result of the cross-check in operation S314.

The apparatus 10 for forward collision avoidance assist determines whether a candidate object is present within the driving trajectory of the vehicle in operation S316. When it is determined that the candidate object is present within the driving trajectory of the vehicle, the apparatus 10 for forward collision avoidance assist may determine the candidate object as a target object and control a brake system based on a risk of collision between the vehicle and the target object in operation S318.

Each component of the apparatus (e.g., the driving environment information collector 110, front object information acquirer 120, driving trajectory generator 130, candidate object selector 140, target object determiner 150, and controller 160) or method according to the present disclosure may be implemented as hardware or software, or a combination of hardware and software. In addition, a function of each component may be implemented as software and a microprocessor may be implemented to execute a function of software corresponding to each component.

Various embodiments of the systems and techniques described herein may be implemented by a digital electronic circuitry, an integrated circuitry, a field programmable gate array (FPGA), an application specific integrated circuit (ASIC), a computer hardware, a firmware, software, and/or a combination thereof. These various embodiments may be implemented by one or more computer programs executable on a programmable system. The programmable system includes at least one programmable processor (which may be a special-purpose processor or general-purpose processor) coupled to receive data and instructions from, and transmit data and instructions to, a storage system, at least one input device, and at least one output device. Computer programs (also known as programs, software, software applications, or codes) contain instructions for a programmable processor and are stored in a "computer-readable recording medium".

The computer-readable recording medium includes all types of recording devices in which data readable by a computer system is stored. The computer-readable recording medium may be a non-volatile or non-transitory medium, such as ROM, CD-ROM, a magnetic tape, a floppy disk, a memory card, a hard disk, a magneto-optical disk, storage device, etc., and may further include a transitory medium such as a data transmission medium. In addition, the computer readable recording medium may be provided in a distributed processing system where computer systems are networked to store and execute the computer readable codes at distributed locations.

Although it is described that operations are sequentially performed in a flowchart of the present specification, this is merely illustrative of the technical idea of an embodiment of the present disclosure. In other words, one of ordinary skill in the art to which an embodiment of the present disclosure pertains may change the order described in the flowchart of the present specification without departing from the essential characteristics of an embodiment of the present disclosure or perform one of each process. Since the above process may be variously modified and modified by executing the above process in parallel, the flowchart of the present specification is not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method for forward collision avoidance assist, the method comprising:
  collecting driving environment information of a vehicle;
  detecting at least one front object positioned in front of the vehicle and acquiring front object information of the at least one front object;
  generating a driving trajectory of the vehicle based on motion information of the vehicle;
  selecting a candidate object from the at least one front object based on the driving environment information and the front object information;
  determining a target object based on information of the candidate object and the driving trajectory of the vehicle; and
  controlling a brake system included in the vehicle based on a risk of collision between the vehicle and the target object,
  wherein the driving environment information comprises a type of road on which the vehicle is traveling,
  wherein the selecting comprises:
  acquiring an expected object type suitable for the type of road on which the vehicle is traveling from a reference table, the reference table includes information on at least one expected object type corresponding to each road type among a plurality of road types;
  selecting, from the reference table, an object corresponding to the expected object type as the candidate object; and
  identifying a front object that is not selected as the candidate object, as a possibly misrecognized object;
  cross-checking again whether a sensor has misrecognized the possibly misrecognized object; and
  determining whether to select the possibly misrecognized object as the candidate object according to a result of the cross-checking,
  wherein the determining a target object comprises:
  classifying a plurality of candidate objects by each object type; and
  determining multiple target objects by each object type by determining each candidate object for each object type positioned in the driving trajectory of the vehicle.

2. The method of claim 1,
  wherein the front object information comprises at least one of a type of the front object, a position of the front object, a relative speed between the vehicle and the front object, or a relative distance between the vehicle and the front object; and wherein the motion information comprises at least one of a position, a speed, a yaw rate, or a steering angle of the vehicle.

3. The method of claim 2,
wherein the selecting further comprises selecting the candidate object suitable for the driving environment information of the vehicle from the front object based on the type of road on which the vehicle is traveling and the type of the front object.

4. The method of claim 1,
wherein the selecting further comprises:
determining whether the driving environment information is valid; and
selecting the front object as the candidate object upon determining that the driving environment information is invalid.

5. The method of claim 1,
wherein the determining of the target object comprises determining the candidate object as the target object when the candidate object is positioned within the driving trajectory of the vehicle.

6. An apparatus for forward collision avoiding assist, the apparatus comprising:
a driving environment information collector configured to collect driving environment information of a vehicle by using at least one of GPS or V2X communication;
a front object information acquirer configured to detect at least one front object positioned in front of the vehicle and acquire front object information of the at least one front object using at least one of a camera or a radar;
a driving trajectory generator configured to generate a driving trajectory of the vehicle based on motion information on the vehicle, the motion information obtained from at least one sensor mounted on the vehicle;
a candidate object selector configured to select a candidate object from the at least one front object based on the driving environment information and the front object information;
a target object determiner configured to determine a target object based on information of the candidate object and the driving trajectory of the vehicle; and
a controller configured to control a brake system included in the vehicle based on a risk of collision between the vehicle and the target object,
wherein the driving environment information comprises a type of road on which the vehicle is traveling,
wherein the candidate object selector is further configured to acquire an expected object type suitable for the type of road on which the vehicle is traveling from a reference table, the reference table includes information on at least one expected object type corresponding to each road type among a plurality of road types road, and to select, from the reference table, an object corresponding to the expected object type as the candidate object,
wherein the candidate object selector is further configured to identify a front object that is not selected as the candidate object, as a possibly misrecognized object, to cross-check again whether the at least one sensor has misrecognized the possibly misrecognized object, and to determine whether to select the possibly misrecognized object as the candidate object according to a result of the cross-checking, and
wherein the target object determiner is further configured to classify a plurality of candidate objects by each object type, and to determine multiple target objects by each object type by determining each candidate object for each object type positioned in the driving trajectory of the vehicle.

7. The apparatus of claim 6,
wherein the front object information comprises at least one of a type of the front object, a position of the front object, a relative speed between the vehicle and the front object, or a relative distance between the vehicle and the front object; and
wherein the motion information comprises at least one of a position, a speed, a yaw rate, or a steering angle of the vehicle.

8. The apparatus of claim 7,
wherein the candidate object selector is further configured to select the candidate object suitable for the driving environment information of the vehicle from the front object based on the type of road on which the vehicle is traveling and the type of the front object.

9. The apparatus of claim 6,
wherein the candidate object selector is further configured to determine whether the driving environment information is valid, and select the front object as the candidate object upon determining that the driving environment information is invalid.

10. The apparatus of claim 6,
wherein the target object determiner is configured to determine the candidate object as the target object when the candidate object is positioned within the driving trajectory of the vehicle.

11. A non-transitory computer-readable recording medium having instructions stored therein, wherein the instructions, when executed by a computer, cause the computer to execute the following operations:
collecting driving environment information of a vehicle;
detecting at least one front object positioned in front of the vehicle and acquiring front object information of the at least one front object;
generating a driving trajectory of the vehicle based on motion information of the vehicle;
selecting a candidate object from the at least one front object based on the driving environment information and the front object information;
determining a target object based on information of the candidate object and the driving trajectory of the vehicle; and
controlling a brake system included in the vehicle based on a risk of collision between the vehicle and the target object,
wherein the driving environment information comprises a type of road on which the vehicle is traveling,
wherein the selecting comprises:
acquiring an expected object type suitable for the type of road on which the vehicle is traveling from a reference table, the reference table includes information on at least one expected object type corresponding to each road type among a plurality of road types;
selecting, from the reference table, an object corresponding to the expected object type as the candidate object; and
identifying a front object that is not selected as the candidate object, as a possibly misrecognized object, cross-checking again whether a sensor has misrecognized the possibly misrecognized object; and
determining whether to select the possibly misrecognized object as the candidate object according to a result of the cross-checking, and wherein the determining a target object comprises:

classifying a plurality of candidate objects by each object type; and determining multiple target objects by each object type by determining each candidate object for each object type positioned in the driving trajectory of the vehicle.

12. The recording medium of claim 11, wherein the front object information comprises at least one of a type of the front object, a position of the front object, a relative speed between the vehicle and the front object, or a relative distance between the vehicle and the front object; and wherein the motion information comprises at least one of a position, a speed, a yaw rate, or a steering angle of the vehicle.

13. The recording medium of claim 12, wherein the selecting further comprises selecting the candidate object suitable for the driving environment information of the vehicle from the front object based on the type of road on which the vehicle is traveling and the type of the front object.

14. The recording medium of claim 11, wherein the selecting further comprises:

determining whether the driving environment information is valid; and selecting the front object as the candidate object upon determining that the driving environment information is invalid.

15. The recording medium of claim 11, wherein the determining of the target object comprises determining the candidate object as the target object when the candidate object is positioned within the driving trajectory of the vehicle.

* * * * *